United States Patent [19]

Nicolas

[11] Patent Number: 5,242,102
[45] Date of Patent: Sep. 7, 1993

[54] METHOD FOR FORMING AND DIFFUSION BONDING TITANIUM ALLOYS IN A CONTAMINANT-FREE LIQUID RETORT

[76] Inventor: Raymond G. Nicolas, 10010-D Royal Oak Rd., Sun City, Ariz. 85351

[21] Appl. No.: 990,657

[22] Filed: Dec. 14, 1992

[51] Int. Cl.⁵ .................... B23K 20/02; B23K 20/14
[52] U.S. Cl. .................... 228/193; 72/364; 228/265; 228/235.1; 228/262.72
[58] Field of Search ........... 228/193, 240, 242, 263.21, 228/265; 72/364

[56] References Cited

U.S. PATENT DOCUMENTS

| | | | |
|---|---|---|---|
| 2,903,785 | 9/1959 | Hanink et al. | 29/156.8 |
| 3,574,924 | 4/1971 | Dibble | 228/193 X |
| 3,815,219 | 6/1974 | Wilson | 228/193 |
| 3,920,175 | 11/1975 | Hamilton et al. | 228/173 |
| 3,927,817 | 12/1975 | Hamilton et al. | 228/157 |
| 4,013,210 | 3/1977 | Deminet | 228/193 X |
| 4,141,483 | 2/1979 | Untilov et al. | 228/193 |
| 5,119,535 | 6/1992 | Gnagy et al. | 72/364 X |

Primary Examiner—Kenneth J. Ramsey
Attorney, Agent, or Firm—Antonio R. Durando; Harry M. Weiss

[57] ABSTRACT

A method of forming metallic structures that consists of immersing shaping dies with a blank workpiece sandwiched between them in a molten metal or alloy bath at a temperature within the superplastic temperature range of the workpiece. The pressure necessary for forming the workpiece is then applied by using weights or other means disposed over the dies. The workpiece is allowed to be formed by the gravitational force of the weights while it is maintained in a superplastic state. A metal or alloy that is free of harmful elements and contaminants that cause damage to the physical properties of the workpiece and that has a melting point below the superplasticity range of the workpiece is suitable for the molten bath. The molten metal serves the dual purpose of displacing all contaminants from the surface of the workpiece and of providing a conductive source of heat for raising the temperature of the workpiece to its superplastic range. Because of the contamination-free environment, very high working temperatures are permitted by this process and, correspondingly, relatively low loading pressures are required to achieve the desired deformation; thus, if necessary, relatively long process times are available for producing exact and intricate configurations that cannot otherwise be successfully obtained.

20 Claims, 1 Drawing Sheet

METHOD FOR FORMING AND DIFFUSION BONDING TITANIUM ALLOYS IN A CONTAMINANT-FREE LIQUID RETORT

CROSS-REFERENCE TO RELATED DOCUMENTS

This application is based on Disclosure Document No. 306,578, filed on Apr. 24, 1992.

BACKGROUND OF THE INVENTION

1. Field of the Invention

This invention pertains to the general field of forming, forging and joining metals and alloys in a superplastic state in order to fabricate metallic structures. In particular, it provides a new way of isolating metals and alloys during the fabrication process from contaminants that affect the integrity and strength of the final product.

2. Description of the Related Art

It is known that certain metals and alloys exhibit the property of superplasticity when heated to a temperature within a given range below the phase transformation temperature. Under superplastic conditions, these metals and alloys display a high strain-rate sensitivity that permits high tensile elongations not otherwise achievable without affecting the strength of the metal or causing what is normally referred to as a "necking" effect, which is normally unacceptable. The metal can thus be formed in complex shapes by applying relatively low deformation stresses, which require less sophisticated equipment and result in less wear of the forming tools. The main problem with this process lies in the relatively high operating temperature, which promotes reaction with ambient contaminants that adversely affect the integrity of the metal. Therefore, it becomes necessary, at considerable additional cost, to use equipment that is capable of controlling the environment and ensuring the cleanliness of the metallic workpiece.

The process of diffusion bonding, by which metal surfaces are joined together through the commingling of atoms at the joint interface, is also enhanced by superplastic conditions. Inasmuch as pressure exerted for a period of time between adjoining surfaces of the same or different metals is the driving force for atomic diffusion between the two surfaces, the mobility of the molecules at a given pressure is greatly improved by the high temperatures required for superplasticity. As in the case of forming, the high operating temperatures promote the diffusion and reaction of ambient contaminants with the metal workpiece which embrittle the bond between the surfaces. Therefore, the process of diffusion bonding, which is often carried out concurrently with the forming of metals under superplastic conditions, also requires an environment that is as free as possible of contaminating substances.

Among the various metals utilized in the fabrication of metallic structures (such as titanium, hafnium, zirconium, and other metals), titanium and its alloys are known to exhibit superplastic properties greater than those of any other metal or alloy within a temperature range that is also suitable for diffusion bonding. Therefore, titanium and titanium alloys are particularly suitable for superplastic forming and diffusion bonding at temperatures ranging between 1,450° F. and 1,850° F. For a successful operation, though, it is necessary to heat and form the metal in a controlled environment that is as free as possible of oxygen, nitrogen and water vapor, which tend to form brittle oxygen, nitrogen and hydrogen compounds with the metal. Thus, several processes have been developed for protecting the surface of the titanium or titanium-alloy workpiece from coming into contact with these contaminants. Some methods describe the use of protective coatings to isolate the surface of the metal; others utilize inert atmospheres for carrying out the forming and diffusion bonding processes.

For example, U.S. Pat. No. 2,903,785 to Hanink et al. (1959) discloses a method of forging titanium by first coating it with a titanium-aluminum alloy. The coating is formed on the surface of the workpiece by immersing it in a fused salt bath that provides a protective layer to avoid oxidation of the titanium at the high temperatures required for forging. The workpiece is then immediately immersed in a molten aluminum-coating metal, wherein the aluminum forms an alloy with the titanium on the surface of the piece. After forging, the superficial alloy is removed from the finished product.

In U.S. Pat. No. 3,920,175 (1975) and U.S. Pat. No. 3,927,817 (1975), Hamilton et al. describe a method for fabricating metallic structures by superplastic forming and diffusion bonding under an inert gas and/or a vacuum environment in order to prevent contamination of the metal surfaces. Fluid pressure loading is utilized to cause the workpiece to deform against a shaping structure under superplastic conditions.

Both approaches have some drawbacks in spite of the improved operating conditions resulting therefrom. The process of coating the surface of a blank workpiece before forming it at superplastic temperatures entails several steps that may not be otherwise necessary or desirable. The protective coating must first be deposited on the piece under relatively clean conditions and then it must be removed to obtain the desired end product. Similarly, the approach of conducting superplastic forming under inert conditions is difficult to achieve because some contamination often occurs as a result of small quantities of oxygen and other contaminants in the inert gas. Thus, all efforts to provide some protective insulation for these metals during deformation have proven to be relatively unsuccessful. In addition, all current processes are time consuming because many steps have to be taken (such as coating the workpiece with a protective material; producing an inert environment; and creating a vacuum) that are not directly contributing to the forming process. These processes also require expensive equipment, such as needed for maintaining a sealed environment under vacuum and for providing the required heat and pressure differential for forming the workpiece in an entirely self-contained process chamber.

Another approach is based on the idea of forming an oversize structure at superplastic temperatures with minimal contamination controls, permitting the outer layer of the product to be embrittled by contamination. This layer is then machined off, obviously at considerable expense and waste of material.

Therefore, any process, material, or technique that might result in the creation of a contaminant-free environment under the operating conditions required for superplastic forming and diffusion bonding would be of great usefulness and commercial value to the industry. The present invention deals with a new approach to providing such an environment while retaining all conditions that are necessary for a successful process. That is, the method of this invention is practiced at the proper temperature range for allowing workpiece deformation without fracture; it is not subjected to time limitations, so that the correct strain rate can be applied to the workpiece; and it is suitable for different working pressure to effect either deformation or bonding, or both, as required by the particular application.

BRIEF SUMMARY OF THE INVENTION

One objective of this invention is the development of a process for forming metals and alloys that exhibit superplastic properties under conditions wherein no ambient contaminants are allowed to affect the surface of the workpiece.

Another objective of the invention is a process that produces a contaminant-free environment as a necessary and concurrent step in the procedure of forming, forging or diffusion bonding of the workpiece.

Another goal is a process of forming and diffusion bonding that requires minimal pressure loading to effect the desired deformation and bonding.

Still another goal is a process that is suitable for net-size forming, thus eliminating the need for machining of the final product.

A further objective of this invention is the development of a process that is applicable to all metals and alloys suitable for forming, forging, diffusion bonding, or otherwise hot processing under superplastic conditions.

Still another objective of the invention is a process that is particularly suitable for forming and diffusion bonding of titanium and titanium alloys.

Accordingly, the present invention consists of immersing the shaping tool and the blank workpiece in a molten metal or alloy bath at a temperature within the superplastic temperature range of the workpiece. A suitable metal or alloy is one that is free of harmful elements and contaminants that cause damage to the physical properties of the workpiece and that has a melting point below the superplasticity range of the workpiece. The molten metal bath serves the dual purpose of displacing all contaminants from the surface of the workpiece and of providing a conductive source of heat for raising the temperature of the workpiece to its superplastic range. The necessary pressure is then applied to the workpiece for forming it as desired and, if applicable, for diffusion bonding or brazing it with another workpiece similarly immersed in the molten metal bath. Because of the contamination-free environment, very high working temperatures are permitted by this process and, correspondingly, relatively low loading pressures are required to achieve the desired deformation; thus, if necessary, relatively long process times are available for producing exact and intricate configurations that cannot otherwise be successfully obtained.

Therefore, to the accomplishment of the objectives described above, this invention consists of the features hereinafter illustrated in the examples, fully described in the drawings and the detailed description of the preferred embodiment and particularly pointed out in the claims. However, such examples and description disclose but one of the various ways in which the invention may be practiced.

DETAILED DESCRIPTION OF THE INVENTION

The main point of this invention is the idea of using a contaminant-free metal in its liquid state to displace by immersion all contaminants that have a deteriorating effect on the metal from the surface of a blank metal workpiece while it is being heated to a superplastic condition for forming, brazing or diffusion bonding. Because of the high thermal conductivity and heat capacity of metals, the molten metal bath is also utilized to provide the heat necessary to raise and maintain the temperature of the workpiece by thermal conduction directly into the body of the piece. Although the invention is applicable to the forming and diffusion bonding of any metal or alloy that exhibits superplastic properties, it is disclosed herein particularly with reference to the manufacture of titanium structures by forming titanium or titanium alloys in a molten brass or bronze alloy bath at superplastic temperatures in the 1,700° to 1,825° F. range. As an example, the invention is described in the context of process and apparatus for fabricating hollow compressor-fan blades for jet engines.

Figure 1:
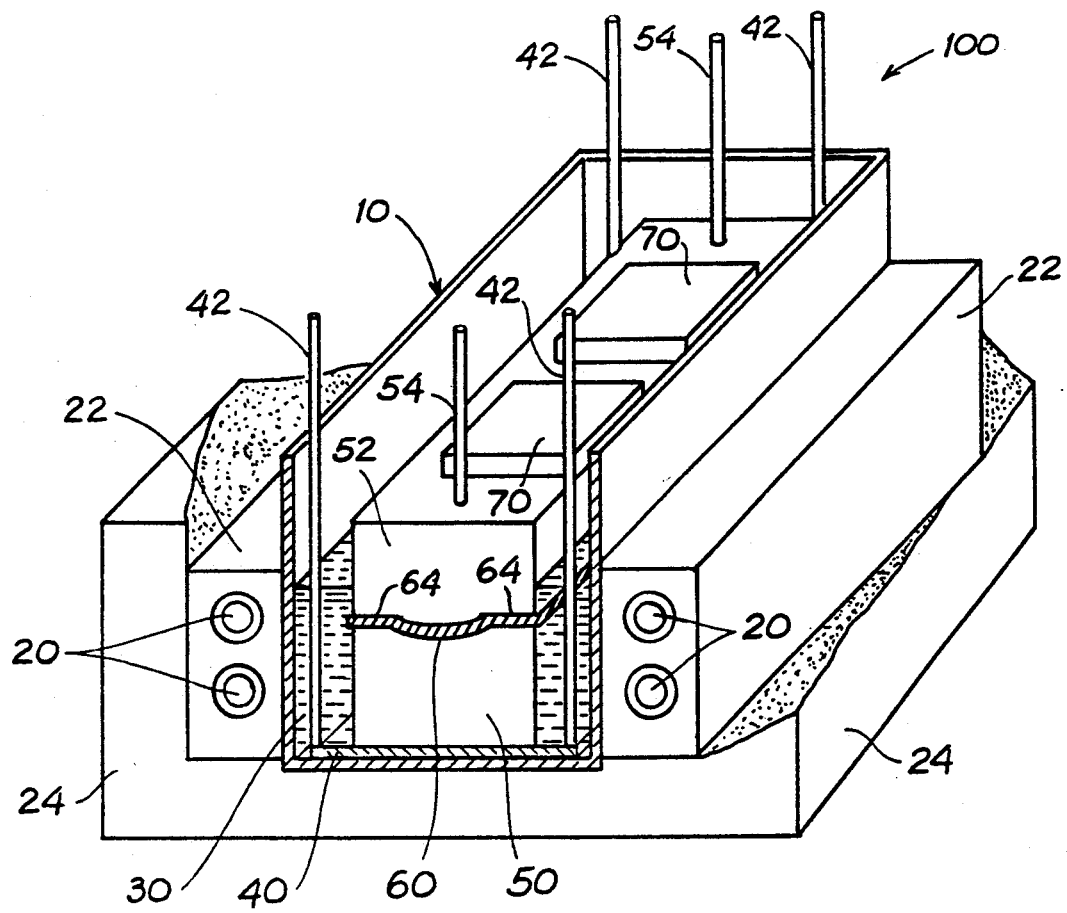
FIG. 1 is a partially sectioned, schematic illustration of liquid retort apparatus that is suitable for practicing the metal forming and bonding process of this invention.

Referring to the drawings, wherein like parts are designated throughout with like numerals, FIG. 1 is a schematic representation of liquid retort equipment 100 that can be utilized for carrying out the process of this invention. The equipment 100 consists of an open tank 10 made of material capable of withstanding the high operating temperatures of the process without undergoing deformation or failure (the tank is shown sectioned at one end to permit viewing of the various components inside). For the purpose of fabricating structures made with titanium and titanium alloys, which hereinafter will be collectively referred to as titanium alloys, the tank 10 must be capable of containment of a molten metal bath at temperatures up to 2,250° F. Thermostatically controlled heating elements 20 held in ceramic supports 22 are placed in intimate contact with the outside wall of the tank 10 to provide the heat necessary to bring the tank and its contents to the desired temperature. A layer of insulation 24 is also provided around and below the tank and the heating elements in order to minimize heat losses and improve temperature control of the molten metal bath 30 contained in the tank.

For the purposes of fabricating hollow titanium-alloy fan blades using 6al-4v titanium (a titanium alloy containing 6% aluminum and 4% vanadium) or 8mo-2v titanium (8% molibdenum, 2% aluminum), which exhibit an ideal working (superplastic) temperature of 1,725° F., the metal bath 30 consists preferably of a 60% copper 40% zinc alloy, which has a melting point of approximately 1,634 ° F. In general, diffusion bonding is accomplished at a temperature at least equal to one half the melting point of the base metal. In the case of a titanium alloy, the melting point of pure titanium is 3,272° F.; therefore, diffusion bonding occurs at temperatures above 1,636° F. In the case of 6al-4v titanium alloy, diffusion bonding occurs at temperatures greater than 1,690° F.

Obviously, as those skilled in the art would know, specific molten bath alloys must be chosen for each particular operation, depending on the particular metallic composition and structural configuration of the end product. In addition to the melting point, other relevant considerations must be the potential corrosive nature of the molten metal bath on the workpiece, wetting properties, ductility, brazing characteristics, and tendency to form an alloy with the workpiece. The temperatures used to form and diffusion bond the metal of a given workpiece is a variable that must conform to the superplastic temperature range of the specific metal constituting the workpiece and to the desired bonding specifications. Also, while the invention is described primarily in terms of forming and diffusion bonding, it is recognized that superplastic operating temperatures are suitable as well for brazing, joining or otherwise adding configurations to the workpiece.

A support basket 40 (also illustrated in sectional view in FIG. 1), that fits inside the tank 10 and is capable of supporting forming dies 50 and 52, is equipped with positioning means 42 for controlling its vertical position within the tank. The basket 40 and the positioning means 42 are typically made of stainless steel, which can withstand the operating conditions in the tank. A lower, female mold or die 50 containing the end product's desired pattern in its horizontal upper face is provided for placement in the basket 40. Similarly, a conforming upper, male die 52, having positioning arms 54, is also provided for placement on top of the metallic workpiece 60 sandwiched between the two dies. Finally, various weights 70 are used to control the pressure exerted by the upper die 52 on the workpiece 60.

The dies used for metal forming, generally consisting of cast ceramic for high temperature use, are manufactured for specific applications and, therefore, contain guiding features for properly placing the workpiece on top of the lower die and for aligning the upper and lower dies. Similarly, the geometry of the workpiece is designed to fit the space between the male and female patterns in the two dies. Note that these equipment features and requirements are all known in the art.

In operation, the process of this invention consists of filling the tank 10 with a metal or alloy having the appropriate melting temperature and other characteristics for the specific application. For example, the 60% copper - 40% zinc alloy mentioned above could be used for a 6al-4v titanium workpiece. Other bath alloys could consist, without limitation, of copper, aluminum, zinc, tin, silver, gold, lead, nickel, phosphorous, antimony, manganese, magnesium, cadmium, or silicon, all of which are substances having a melting point below the superplastic temperature range of titanium alloy workpieces. Enough material should be used to ensure that the level of the resulting molten bath 30, after the material has been heated to its melting temperature, is sufficient to cover the workpiece once the basket 40 is immersed in the tank. Thus, the tank 10 is heated with the heating elements 20 to cause the material in the tank to reach its melting point (about 1,634° F., in the case of 60% copper 40% zinc alloy) and form the molten bath 30. The basket 40 containing the lower die 50 is then lowered into the molten bath until it is completely submerged. Without any prior conditioning (such as by plating, coating or heating), the workpiece 60 is then lowered on top of the lower die 50 to cover the pattern in its top surface (the structure of one half of a hollow fan blade, for example) while the workpiece is also submerged in the molten bath. The upper die 52 is then lowered on top of the workpiece 60 in alignment with the lower die 50, so that the workpiece is sandwiched in the space between the male and female patterns in the two dies, leaving the top portion of the upper die exposed above the molten bath. Weights 70 are then placed on top of the upper die 52 to provide the pressure deemed necessary to form the workpiece at the operating temperature. Obviously, different weights can be used at different temperatures within the superplastic range, or by utilizing different forming times at a given temperature. Thus, the specific operating temperature, forming time, pressure applied to the workpiece and its method of application (such as hydraulic, mechanical, or gravity) are all variables that one skilled in the art would know to select as a function of the particular geometry and characteristics of the workpiece. In the case of a 6al-4v titanium workpiece, it is found that a total of 200 pounds of weight spread over a die surface of approximately 40 square inches is suitable to form the fan-blade component used for illustration (that is, about 5 psi). For diffusion bonding, a pressure of about 50 psi is required.

For best results, the upper die is allowed to form the workpiece strictly by means of gravity, until the two dies come together and show a complete closure around the pattern formed between them, as would be detected by a gauge or stop between the dies (as are normally used in the industry). This permits the titanium workpiece to conform to the shape of the die in its own time, avoiding damaging stresses that might otherwise be caused by excessive pressure on the superplastic metal. When the workpiece is completely formed, the upper die 52 is raised out of the way and the lower die is raised to the point where the formed workpiece is above the level of the molten bath. Excess molten metal is allowed to drain from the workpiece, which is then removed and placed in an apposite rack for final draining and cooling, according to standard metal forming techniques.

The example of a hollow compressor-fan blade is used herein because it permits the illustration of how the process of this invention is also suitable for joining metal components by diffusion bonding. The formed workpiece produced by the steps outlined above consists of a solid component constituting one half of a hollow blade. The other half 62, having matching peripheral flanges 64, is manufactured following the same procedure with the same or a different set of dies. The two halves then can be joined by diffusion bonding of the overlapping structures by following the same basic steps.

Figure 2:
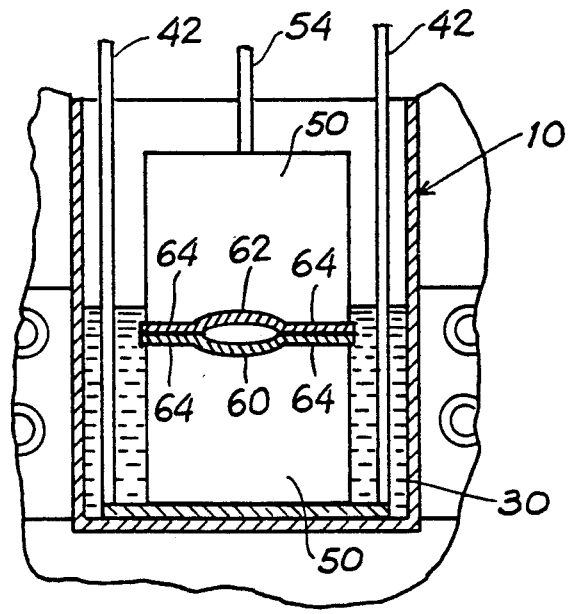
FIG. 2 is a partially sectioned, front view of the apparatus shown in FIG. 1 when used with two female dies to join two matching halves of a hollow fan blade by diffusion bonding.

The two lower (female) dies 50 used in the fabrication of each half 60 and 62 of the blade are utilized to sandwich the two blade halves having overlapping matching flanges 64 while they are enclosed between the dies, as illustrated in the partially-sectioned front view of FIG. 2. The dies and formed half-blades sandwiched therebetween are then lowered into the molten bath, which is kept at about the same superplastic temperature used in the forming procedure, and the contact points between the blade components are subjected to about 50-60 psi pressure by adding appropriate weights to the upper die for a time sufficient to allow the molecular migration that produces fusion bonding of the two components, as one skilled in the art would know. It is found that adequate joining of the two halves by diffusion bonding under these conditions occurs in about 20 to 25 minutes.

Thus, this process provides a means for conducting both metal forming and diffusion bonding with the same apparatus and under the same operating conditions, thus greatly reducing the cost of manufacturing structures that require both steps. In addition, when the end product consists of a structure obtained by joining two components that share a common geometry, such as in the case of the hollow blade used for illustration, the same dies can also be utilized for the dual purpose of forming and diffusion bonding.

The method affords the advantage of providing complete protection from contamination by automatically displacing contaminants from the working surface, thus eliminating the need for electroplating, coating, or otherwise preconditioning the workpiece before exposure to the very high temperature required for superplastic work. The displacement of contaminants is immediate upon immersion of the workpiece in the molten metal bath, so that no contaminants are present when the workpiece reaches the high superplastic temperatures that are most most critical for metal deterioration. Because the molten metal bath is in direct contact with the dies and the workpiece, and because metals have a very high thermal conductivity and heat capacity, conductive thermal transfer to the workpiece is very efficient and uniform throughout the entire body of the workpiece. The apparatus required to perform the procedure is simple and, therefore, relatively inexpensive. Low-cost, cast ceramic dies may be used that permit precision forming with repeatable accuracies. No pressurization system for loading the workpiece (other than by weights operating under gravity) is required to shape or bond the workpiece, and the same equipment can be used to form, bond, braze or perform any combination thereof on the workpiece.

While joining parts by diffusion bonding, partial brazing may also occur due to bath-metal particles that are trapped between adjoining surfaces. It is found that this further reinforces the bond between the joined components. In addition, the presence of a different material (bath metal) within the area of diffusion makes it possible to check the integrity of the bond because the brazing material is visible to an x-ray scan. Otherwise, incomplete bonds are normally not visible. This is a clear advantage for testing high-stress parts, such as compressor fan blades, which require perfect integrity of the bond.

One example where brazing occurs concurrently (and primarily) with diffusion bonding is in the construction of titanium golf-club shafts, which is preferably conducted by joining titanium-alloy components in an aluminum-alloy bath at approximately 1,725° F.

When brazing occurs, bath metal particles may also adhere to the surface of the workpiece and require removal by a reverse electrochemical process, as is well understood in the art.

It is noted that the process of this invention is particularly valuable for fabricating intricate titanium-alloy structures, such as are found in many aircraft components, space vehicles, jet-engine components, high-speed commercial transport vehicles, and light-weight sandwich structures. Modifications to these procedures to fit particular workpiece metals would be obvious to one skilled in the art.

Thus, various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent methods and products.

I claim:

1. A method of forming a metal workpiece sandwiched between the female pattern of a lower die and the male pattern of an upper die in a contaminant-free environment at an operating temperature within the superplastic temperature range of the metal constituting the workpiece, comprising the following steps:
   (a) providing a molten metal bath consisting of a metal having a melting temperature lower than the superplastic temperature range of the workpiece and heating the bath to an operating temperature within the superplastic temperature range of the workpiece;
   (b) submerging the lower die in the molten metal bath provided in step (a);
   (c) lowering the workpiece below the level of the molten metal bath and positioning the workpiece on top of the lower die to cover the female pattern in the lower die;
   (d) lowering the upper die on top of the workpiece in aligned relationship with the lower die, so that the male pattern in the upper die is disposed in conforming relationship with the female pattern in the lower die;
   (e) placing weights on top of the upper die to provide a pressure sufficient to form the workpiece at the operating temperature;
   (f) allowing the upper die to completely enclose the workpiece by coming together with the conforming lower die; and
   (g) removing the workpiece from the molten metal bath.

2. The method defined in claim 1, wherein said step of submerging the lower die in the molten metal bath is accomplished by loading the lower die on a support basket capable of vertical displacement in relation to the bath and by lowering the basket into the bath.

3. The method defined in claim 1, wherein the metal constituting the workpiece is titanium or a titanium alloy.

4. The method defined in claim 3, wherein the operating temperature is between 1,450° F. and 1,850° F.

5. The method defined in claim 3, wherein the operating temperature is between 1,700° F. and 1,825° F.

6. The method defined in claim 1, wherein the metal constituting the workpiece is a titanium alloy containing approximately 6% aluminum and 4% vanadium.

7. The method defined in claim 6, wherein the operating temperature is approximately 1,725° F.

8. The method defined in claim 7, wherein the metal constituting the molten metal bath is a brass alloy containing 60% copper and 40% zinc and having a melting temperature of about 1,634° F.

9. The method defined in claim 1, wherein the metal constituting the molten metal bath is a bronze alloy.

10. The method defined in claim 1, wherein the metal constituting the molten metal bath is a brass alloy.

11. The method defined in claim 10, wherein the metal constituting the molten metal bath is a brass alloy containing 60% copper and 40% zinc and having a melting temperature of about 1,634° F.

12. A method of diffusion bonding two metal workpieces having overlapping structures sandwiched between a lower die and an upper die in a contaminant-free environment at an operating temperature within the diffusion bonding temperature range of the metal constituting each workpiece, comprising the following steps:
  (a) providing a molten metal bath consisting of a metal having a melting temperature lower that the superplastic temperature range of each workpiece and heating the bath to an operating temperature within the superplastic temperature range of each workpiece;
  (b) sandwiching the two metal workpieces in overlapping relationship between the lower die and the upper die;
  (c) lowering the dies and the two metal workpieces sandwiched therebetween into the molten metal bath;
  (d) placing weights on top of the upper die to provide a pressure sufficient to cause the joining of the two workpieces by diffusion bonding at the operating temperature; and
  (e) removing the joined workpieces from the molten metal bath.

13. The method defined in claim 12, wherein the metal constituting the two workpieces is a titanium alloy containing approximately 6% aluminum and 4% vanadium.

14. The method defined in claim 13, wherein the operating temperature is approximately 1,725° F.

15. The method defined in claim 14, wherein the metal constituting the molten metal bath is a brass alloy containing 60% copper and 40% zinc and having a melting temperature of about 1,634° F.

16. The method defined in claim 15, wherein the step of placing weights on top of the upper die to provide a pressure sufficient to cause the joining of the two workpieces by diffusion bonding at the operating temperature is carried out at a pressure of about 50–60 psi for a period of about 20 to 25 minutes.

17. A metallic structure manufactured according to the forming process recited in claim 1.

18. A titanium-alloy structure manufactured according to the forming process recited in claim 11.

19. A metallic structure manufactured according to the diffusion bonding process recited in claim 12.

20. A titanium-alloy structure manufactured according to the diffusion bonding process recited in claim 16.

* * * * *